United States Patent
Johnson et al.

(10) Patent No.: US 9,498,753 B2
(45) Date of Patent: Nov. 22, 2016

(54) METHOD FOR SEALING HOLLOW FIBER MEMBRANES

(75) Inventors: Taylour Johnson, Wilmington, MA (US); David Colby, Wilmington, MA (US)

(73) Assignee: Koch Membrane Systems, Inc., Wilmington, MA (US)

(*) Notice: Subject to any disclaimer, the term of this patent is extended or adjusted under 35 U.S.C. 154(b) by 0 days.

(21) Appl. No.: 13/421,326

(22) Filed: Mar. 15, 2012

(65) Prior Publication Data
US 2013/0240436 A1    Sep. 19, 2013

(51) Int. Cl.
*B01D 69/08* (2006.01)
*B01D 63/02* (2006.01)
*B01D 65/00* (2006.01)

(52) U.S. Cl.
CPC ........... *B01D 63/021* (2013.01); *B01D 63/024* (2013.01); *B01D 65/003* (2013.01); *B01D 2313/04* (2013.01); *Y10T 29/49826* (2015.01)

(58) Field of Classification Search
CPC ................ B01D 63/022; B01D 63/024; B01D 63/021; B01D 63/02; B01D 2313/04; B01D 69/08; B01D 2313/21; B01D 63/06; B01D 65/108; B29C 70/10; B29C 70/766
USPC ........ 210/650, 500.23, 504, 505, 506, 321.6
See application file for complete search history.

(56) References Cited

U.S. PATENT DOCUMENTS

| | | | |
|---|---|---|---|
| 5,232,593 A | 8/1993 | Pedersen et al. | |
| 5,556,591 A | 9/1996 | Jallerat et al. | |
| 5,782,791 A | 7/1998 | Peterson et al. | |
| 7,160,454 B2 | 1/2007 | Vossenkaul et al. | |
| 7,335,301 B2 | 2/2008 | Cheng | |
| 7,531,091 B2 | 5/2009 | Schafer et al. | |
| 7,638,048 B2 | 12/2009 | Schafer et al. | |
| 7,638,098 B2 | 12/2009 | Yu et al. | |
| 7,931,805 B2 | 4/2011 | Schafer et al. | |
| 7,988,855 B2 | 8/2011 | Liu et al. | |
| 2003/0017706 A1 | 1/2003 | Moore et al. | |
| 2003/0034293 A1 | 2/2003 | Simonetti | |
| 2003/0038075 A1 | 2/2003 | Akimoto et al. | |
| 2003/0173706 A1 | 9/2003 | Rabie et al. | |
| 2004/0238432 A1* | 12/2004 | Mahendran ............ | B01D 61/18 210/321.89 |

(Continued)

FOREIGN PATENT DOCUMENTS

| | | |
|---|---|---|
| CN | 1392802 A | 1/2003 |
| CN | 102089067 A | 6/2011 |

(Continued)

OTHER PUBLICATIONS

Material Safety Datasheet of Dyanx 191M, two pages, No Date.*
Product Information Sheet, "Puron® Hollow Fiber Modules. Hollow Fiber Submerged Membrane Modules for MBR Applications", Koch Membrane Systems, Inc., dated Apr. 2010, 2 pgs.
Product Information Sheet, "Puron® Hollow Fiber Rows. Hollow Fiber Submerged Membrane Row for MBR Applications", Koch Membrane Systems, Inc., dated Apr. 2010, 2 pgs.

(Continued)

*Primary Examiner* — David C Mellon
*Assistant Examiner* — Pranav Patel

(57) ABSTRACT

The present invention is directed to a method of sealing the free end of a hollow fiber membrane for use in a single header filtration module by dipping the end of the membrane into a low-viscosity light-curable adhesive and curing the adhesive. The invention further encompasses the resulting sealed hollow fiber membrane with a diameter that is only slightly larger than the diameter of the unsealed membrane.

20 Claims, 5 Drawing Sheets

(56) References Cited

U.S. PATENT DOCUMENTS

| | | |
|---|---|---|
| 2005/0121380 A1 | 6/2005 | De La Cruz |
| 2005/0126982 A1 | 6/2005 | Stachera et al. |
| 2006/0113226 A1 | 6/2006 | Breitner et al. |
| 2006/0175243 A1* | 8/2006 | Mahendran et al. .... 210/321.69 |
| 2008/0168828 A1* | 7/2008 | Endou et al. ................. 73/61.72 |
| 2009/0039012 A1* | 2/2009 | Ryu et al. ...................... 210/496 |
| 2009/0253805 A1 | 10/2009 | Hoyle et al. |
| 2011/0023717 A1 | 2/2011 | Itami |

FOREIGN PATENT DOCUMENTS

| | | |
|---|---|---|
| EP | 2030672 A2 | 3/2009 |
| JP | 60-206412 | 10/1985 |
| JP | 05184878 | 7/1993 |
| JP | 10-15060 A | 1/1998 |
| WO | WO 96/04068 | 2/1996 |
| WO | WO 96/17675 | 6/1996 |
| WO | WO 02/40140 | 5/2002 |
| WO | 2012/147932 A | 11/2012 |

OTHER PUBLICATIONS

JP 05-184878—English machine translation; 1993.
JP 11-319505—English machine translation—1999.
International Search Report/Written Opinion from related PCT Application PCT/US 13/29768 dated May 20, 2013 (7 pages).
Office Action and Search Report received for Chinese Patent Application No. 201380013983.6, mailed on Jul. 22, 2015, 13 pages (4 pages of English Translation and 9 pages of Official Copy).
Office Action received for Japanese Patent Application No. 2015-500475, mailed on Jan. 4, 2016, 8 pages (4 pages of English Translation and 4 pages of Official Copy).
Office Action received for Australian Patent Application No. 2013232486, issued on Oct. 22, 2015, 3 pages.
Extended European Search Report received for European Patent Application No. 13760996.2, mailed on Nov. 2, 2015, 9 pages.
International Preliminary Report on Patentability and Written Opinion Received for PCT Patent Application No. PCT/US2013/029768, mailed on Sep. 25, 2014, 7 pages.
KIPO's Notice of Preliminary Rejection issued on May 12, 2016 for Korean Patent Application No. 10-2014-7026165.

* cited by examiner

METHOD FOR SEALING HOLLOW FIBER MEMBRANES

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention is related to the field of hollow fiber membranes and hollow fiber filtration modules.

2. Description of Related Art

Hollow fiber filtration modules are useful in a variety of filtration processes and generally suitable for immersion in the fluid to be filtered. Standard hollow fiber filtration modules contain bundles of hollow fiber membranes that are secured at each end by a header piece. The hollow fiber membranes generally are secured in place within the header by a potting compound that surrounds the fibers near each end, secures them in place with respect to the other hollow fiber membranes and the header and forms a seal around the membranes. However, both ends of the individual hollow fiber membranes remain open to allow fluid to flow into and/or out of the ends of the membrane through the porting compound.

In another type of hollow fiber filtration module, a single-header filtration module, the hollow fiber membranes are secured by a header at only one end. The other end of the bundle is not secured with a header, and the unsecured ends of the hollow fiber membranes can move freely with respect to each other. In some module designs, movement of the free ends is restricted by a housing, or the unsecured ends are supported by a frame. In other designs the entire fiber bundle may be encased in a housing. In yet other designs the free ends of the membranes are supported only by the fluid in which the filtration module is immersed. In most designs, the free ends of the hollow fiber membranes are sealed to prevent fluid flow into or out of the free ends of the membranes.

BRIEF SUMMARY OF THE INVENTION

The present invention is directed to a method of sealing the free end of a hollow fiber membrane for use in a single-header filtration module by dipping the end of the membrane into a low-viscosity light-curable adhesive and curing the adhesive.

The method of the present invention comprises inserting a first end of the membrane in a low-viscosity light-curable adhesive having a viscosity less than 5000 cps, removing the first end from the adhesive, and exposing the first end to a light source to cure the adhesive. Use of a low-viscosity light-curable adhesive results in a thin coating of adhesive on the exterior of the first end of the hollow fiber membrane. The low viscosity of the adhesive allows the adhesive to flow into the bore of the membrane. Capillary action further causes the low-viscosity adhesive to wick into the inner wall of the membrane. As a result, a plug is formed in the interior bore that further seals the first end of the membrane.

The present invention also encompasses the sealed hollow fiber membrane produced by the process, as well as a hollow fiber filtration module containing fibers sealed by the process of the present invention.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
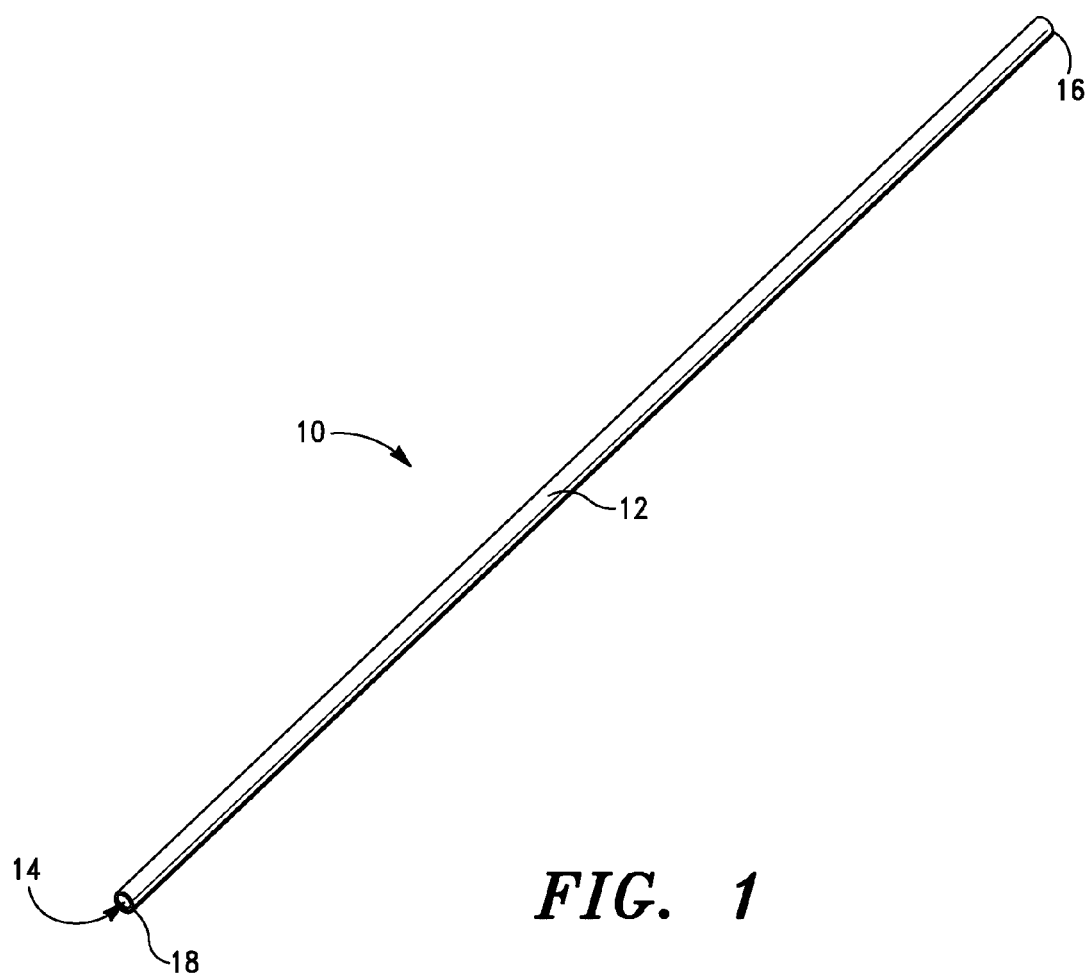
FIG. 1 is a perspective view of an unsealed hollow fiber membrane.

The present invention is directed to a method of sealing the free end of a hollow fiber membrane for use in a single-header filtration module by dipping the end of the membrane into a low-viscosity light-curable adhesive and curing the adhesive. FIG. 1 depicts a hollow fiber membrane 10 prior to sealing. Membrane 10 comprises a long cylindrical tube 12 having a hollow internal bore 14, first end 16 and second end 18. The process of the present invention may be used with any type of hollow fiber membrane. Membrane 10 preferably possesses a diameter of less than 5 mm, more preferably between 0.5 and 3 mm, most preferably about 2.4 to 2.6 mm. Membrane 10 may be a microfiltration membrane or ultrafiltration membrane. However, the process of the present invention may be used with membranes suitable for other types of filtration, such as reverse osmosis or nanofiltration. The process of the present invention is particularly useful for braid-reinforced hollow fiber membranes. The process is preferably used with hollow fiber membranes that will be immersed in or otherwise surrounded by the fluid to be filtered, and can be used with membranes that will be employed in any type of single-header filtration module, including suction-driven and pressure-driven modules and/or modules in which the header is positioned at either the top or the bottom of the module.

Figures 2, 2A:
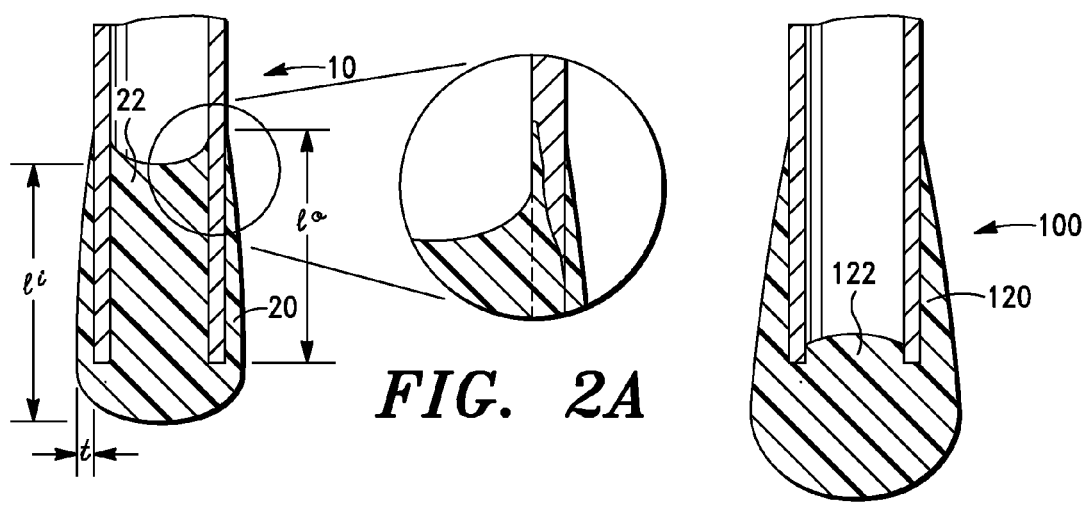
FIG. 2 is a cross-sectional view of a first end of the hollow fiber membrane of FIG. 1 after sealing according to the present invention.
FIG. 2A is an expanded view of a portion of the hollow fiber membrane of FIG. 2 showing penetration of adhesive into the wall of the membrane.

In the process of the present invention, first end 16 of hollow fiber membrane 10 is inserted into a light-curable adhesive and removed. The light-curable adhesive is preferably a low-viscosity adhesive. As shown in FIG. 2, use of a low-viscosity adhesive forms a thin coating 20 of adhesive on the exterior of membrane 10 and will flow into internal bore 14 of membrane 10 to form plug 22. As shown in FIG. 2A, the low-viscosity adhesive also wicks into and extends into the interior wall of membrane 10 integrally to plug 22. Use of a low-viscosity light-curable adhesive is particularly beneficial with braid-reinforced hollow fiber membranes, in that the adhesive can coat, penetrate and encapsulate the fibers of the braid to form a fluid-tight seal, rather than allowing air pockets to form between the braid and the adhesive. This results in a complete seal around plug 22 within internal bore 14, rather than a simple encapsulation around the exterior of first end 16 of membrane 10. The process of the present invention produces a thin coating 20 of adhesive on the exterior of membrane 10 without spalling, separation, air entrapment or exposed areas.

The light-curable adhesive preferably has a viscosity less than 5000 cps, more preferably a viscosity less than 2000 and most preferably between 100 and 1000 cps. In one embodiment, the adhesive has a viscosity between 170 and 230 cps, preferably 200 cps. The adhesive is preferably in the family of acrylated urethane that may include a secondary cure component to allow curing of areas not exposed to the light source.

Returning to FIG. 2, coating 20 of light-curable adhesive is formed around the outside diameter of membrane 10 to a length l° and plug 22 of light-curable adhesive is formed in internal bore 14 to a length l'. The membrane is inserted into the light-curable adhesive to a sufficient depth and for a sufficient time to allow the light-curable adhesive to coat the desired length l° of the outside of the membrane 10 and to produce the desired length l' of plug 22. The longer first end 18 of membrane 10 remains in the adhesive, the further plug 22 wicks up into interior bore 14. Hollow fiber membrane 10 preferably remains in the adhesive for no more than 10 seconds. Preferably membrane 10 remains in the adhesive for between 1 and 5 seconds before it is removed, more preferably 1 second. When membrane 10 is inserted for 1 second, length l' of plug 22 is approximately equal to l° of coating 20.

The length l° of hollow fiber membrane 10 inserted into the light-curable adhesive is preferably at least 2 mm. Preferably length l° inserted into the adhesive is 4 to 10 mm and more preferably about 6 mm. The temperature of the adhesive into which hollow fiber membrane 10 inserted may be any temperature at which the adhesive is sufficiently fluid to allow coating to occur. Preferably the adhesive is maintained at a temperature between 20 and 25° C. Variances in temperature are undesirable, as they may change the viscosity of the adhesive.

Figure 3:
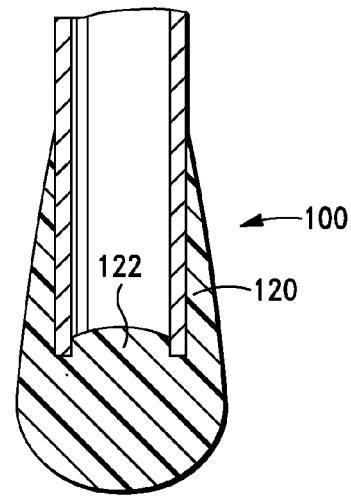
FIG. 3 is a cross-sectional view of a first end of the hollow fiber membrane sealed using a high-viscosity adhesive.

The thickness t of coating 20 of the adhesive on the outside of hollow fiber membrane 10 is preferably less than 0.8 mm, more preferably between 0.05 mm and 0.8 mm such that in one preferred embodiment, the total diameter of membrane 10 and coating 20 is less than 4 mm. In a more preferred embodiment, thickness t is no greater than 0.3 mm, with a total diameter of the sealed first end 16 of membrane 10 in the range of 1.8 mm to 3.4 mm. A thin coating 20 is beneficial because it allows the hollow fiber membranes to be packed in close proximity to each other within the filtration module to achieve an increased density of membranes compared to membranes sealed using thicker adhesives. In one preferred embodiment, the membranes are packed to a density of at least 81 membranes per square inch. As shown in FIG. 3, the use of a higher-viscosity adhesive results in a thicker coating 120 of adhesive surrounding the end of the hollow fiber membrane 100 and a shorter plug 122. The diameter of a membrane 100 coated with a thicker adhesive 120 can be up to about 2 times that of the present invention. A thicker coating requires the hollow fiber membranes to be secured with a greater distance between the fibers, achieving a density of approximately 64 membranes per square inch. Thus, for comparably-sized hollow fiber membranes, the process of the present invention allows a packing density of membranes at least approximately twenty-five percent greater than that of conventional methods.

After removing membrane 10 from the light-curable adhesive, first end 16 is exposed to light to cure the adhesive. Any type of light source producing sufficient light to cure the adhesive may be used, but preferably the light source produces UV (ultraviolet) and/or visible light between the ranges of 200 to 760 nm, and more preferably between 250 and 460 nm. Although any light source known in the art that can cure the adhesive may be used, the use of a LED, irradiating lamp (such as a mercury light), or metal halide light source is preferred. When using an irradiating lamp light source, preferably a light guide between 3 and 8 mm in length and a rod lens, preferably a 0.75 inch to 5 inch rod lens, more preferably a 0.75 inch to 2 inch rod lens, is used. Most preferably, the light source is a LED array light bar.

Figure 4:
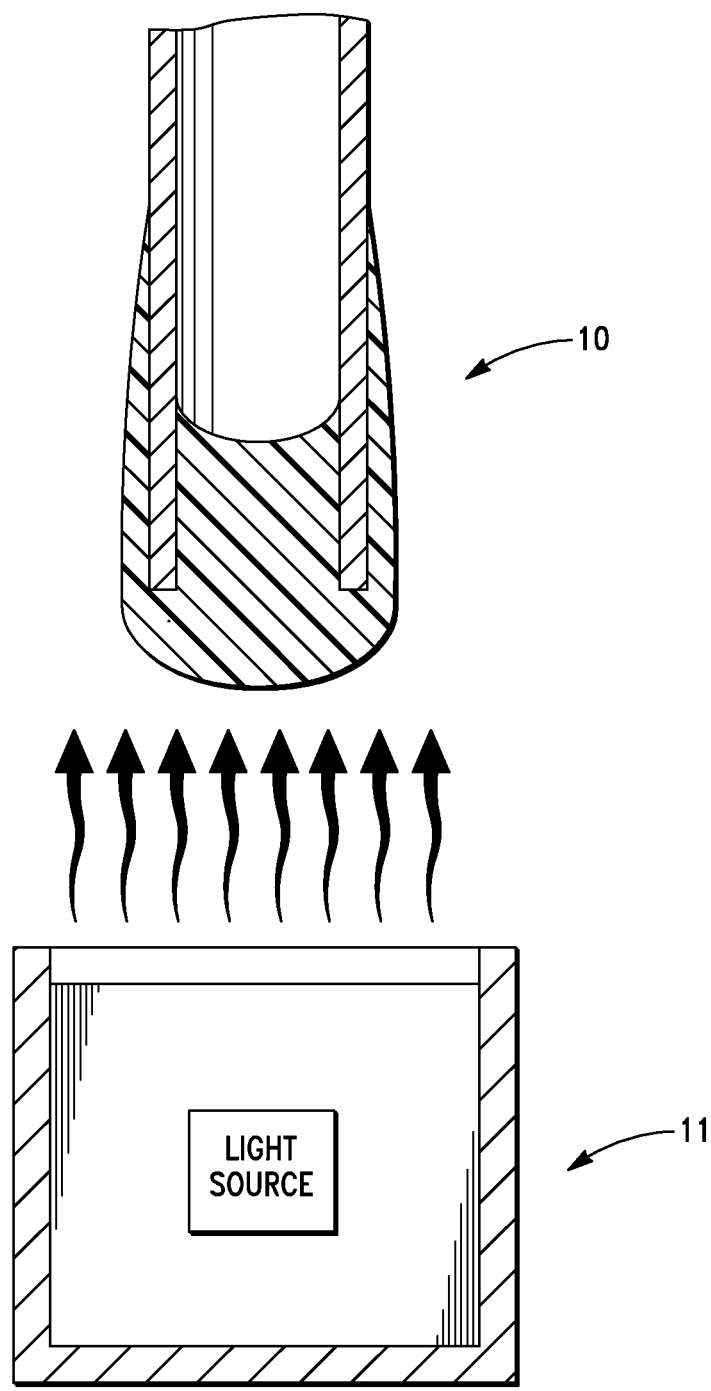
FIG. 4 is a cross-sectional view of a first end of a hollow fiber membrane being cured after sealing by exposure to a light source.

The adhesive should be cured until dry, although a slight tackiness may remain. Preferably, a UV light source of at least at least 100 W, preferably 200 W, is used. The intensity used for curing the adhesive is preferably at least 200 mW/cm$^2$, more preferably at least 800 mW/cm$^2$, using a wavelength of 360 to 410 nm. First end 16 of membrane 10 is preferably held approximately three inches from the light source, although the distance from the light source may be varied depending on the intensity and cure time. As depicted in FIG. 4, most preferably membrane 10 is held in a vertical orientation, approximately three inches above a light source 11. The process of the present invention allows first end 16 to be exposed to the light source for less than 15 seconds and preferably for less than 8 seconds.

In a most preferred embodiment, multiple membranes 10 are inserted, removed and exposed in a single run. Preferably nine membranes 10 may be inserted by each hand in a manual process. The membranes 10 are held apart during insertion to ensure the outside of each membrane is coated. In an automated process, using an apparatus adapted for the purpose, the number of membranes inserted, removed, and exposed at one time may be one or more according to the capacity of the apparatus.

Figure 5:
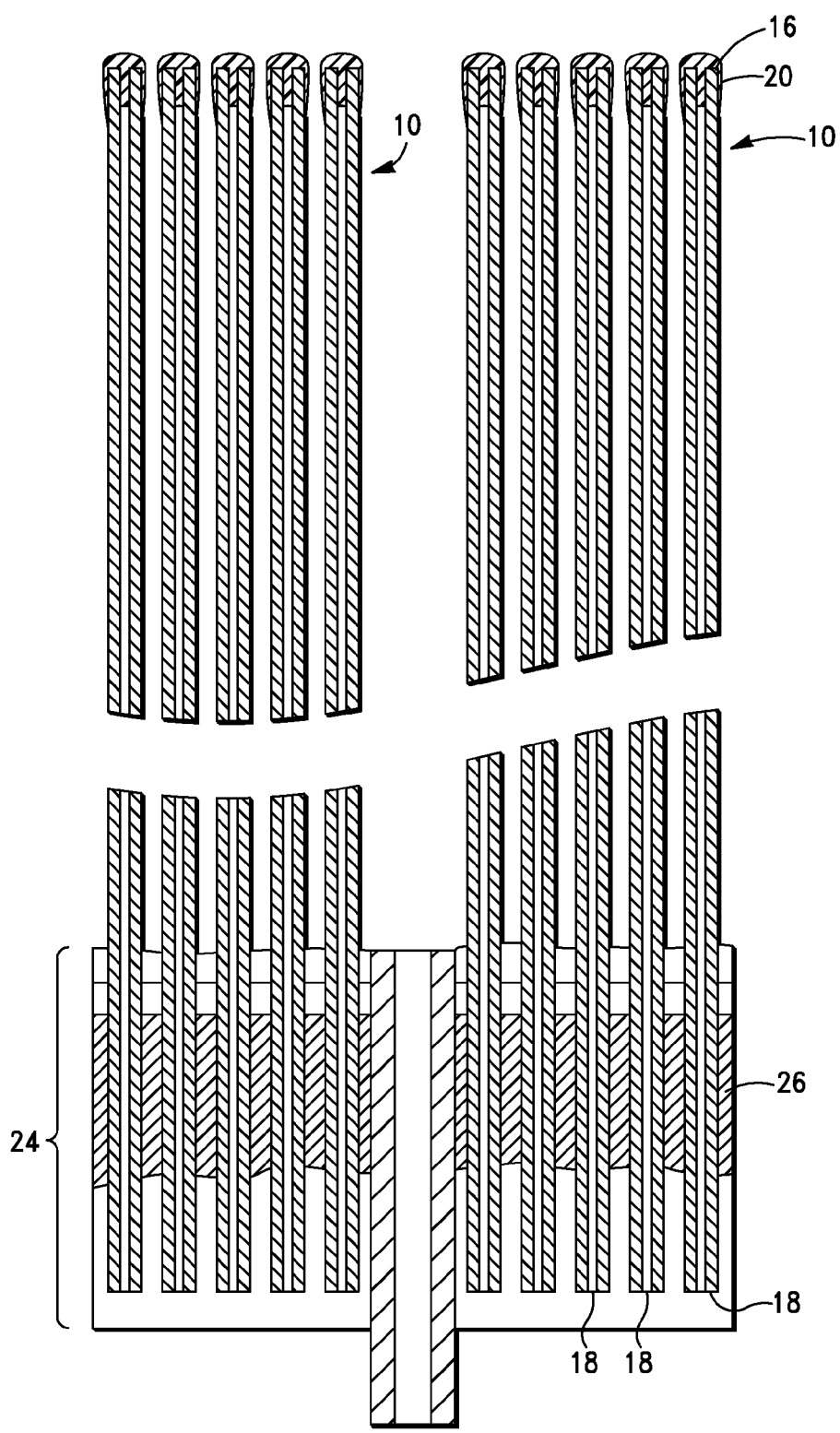
FIG. 5 is a cross-sectional view of a bundle of hollow fiber membranes sealed in accordance with the present invention.

After the light-curable adhesive has been cured, the hollow fiber membranes may be stored before they are assembled into a single-header filtration module. The hollow fiber membranes sealed using the process of the present invention may be assembled into a single header filtration module using any method known in the art. Furthermore, the sealed membranes may be used in any type single-header filtration module, including suction-driven and pressure-driven modules. FIG. 5 depicts an exemplary single-header filtration module in which second ends 18 of hollow fiber membranes 10 are secured within a header 24 by a suitable potting material 26 known in the art, and sealed first ends 16 are not secured in a header. In an alternative embodiment, the second ends 18 of the hollow fiber membranes are first secured in header 24 and first ends 16 are then inserted in the light-curable adhesive, removed and cured using the process of the present invention. This can be done by inserting one fiber membrane at a time, inserting a portion of the fiber membranes at one time, or inserting the entire bundle of fiber membranes simultaneously.

Figure 6:
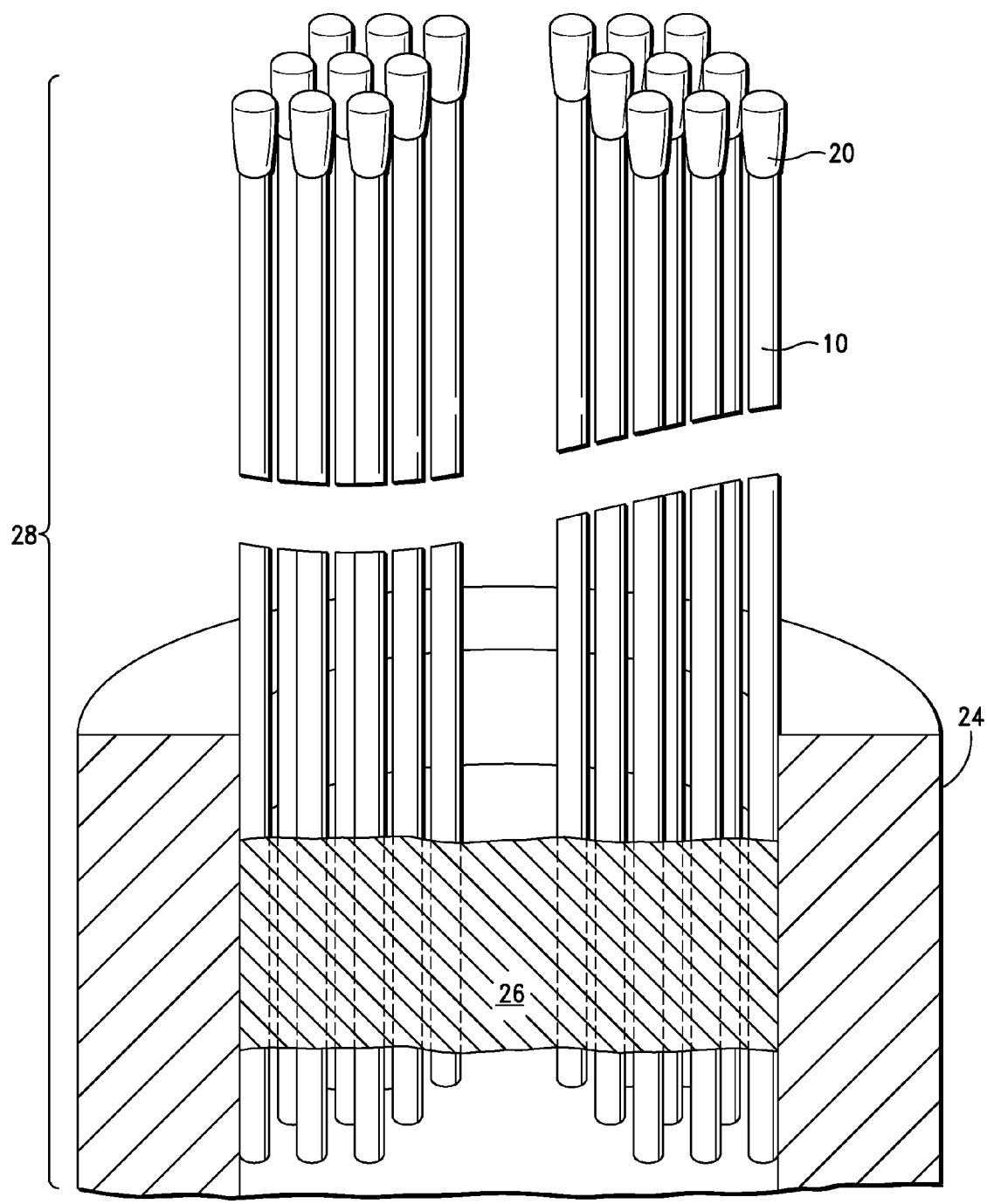
FIG. 6 is a cross-sectional view of an exemplary single header filtration module in which the follow fiber membranes have been sealed in accordance with the present invention.
Figure 7:
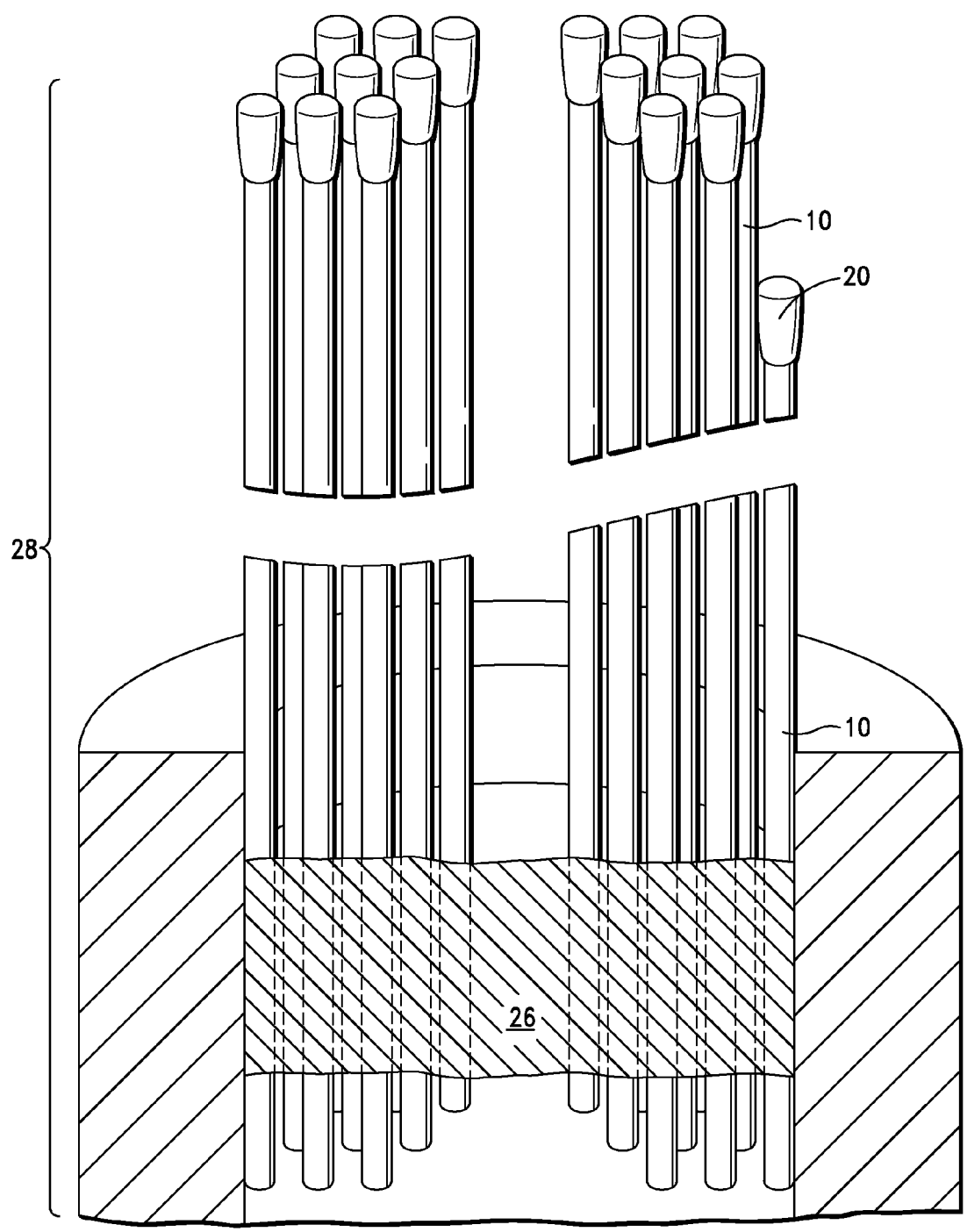
FIG. 7 is a cross-sectional view of the module of FIG. 5 in which a hollow fiber membrane has been repaired according to the present invention.

The process may also be used to repair a hollow fiber membrane in a single-header filtration module. FIG. 6 depicts a single header filtration module 28, in which no repairs have been made. If a leak is detected, any process known in the art may be used to determine which fiber or fibers contain the leak. The damaged fiber is cut below the leak. The cut fiber is then inserted into and removed from the adhesive and cured, using the process of the present invention as described above. FIG. 7 shows module 28 in which a membrane 10 has been repaired in such manner. This allows the repaired hollow fiber membrane to remain in service after the repair.

The term "approximately" as used herein may be applied to and modify any quantitative representation that could permissibly vary without resulting in a change in the basic function to which it is related. For example, while a membrane is disclosed as being held approximately three inches from a light source for curing the applied adhesive, that distance may permissibly vary within the scope of the invention if the curing response is not materially altered.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A method for sealing a free end of a hollow fiber membrane for use in a single-header filtration module, comprising:
    inserting an unsecured first end of said membrane in a low-viscosity light-curable adhesive having a viscosity less than 5000 cps;
    removing said unsecured first end from said adhesive whereby a coating of said adhesive is formed on an exterior of said unsecured first end;
    after removing said unsecured first end from said adhesive, exposing said unsecured first end to a light source to cure said adhesive;
    wherein said coating on the exterior of said unsecured first end after said exposing step has a thickness between 0.05 mm and 0.8 mm;
    securing a second unsealed end of said membrane in a header and wherein said method does not comprise a step of inserting said sealed end of said membrane in a header; and
    wherein a plurality of said membranes is secured in said header such that a density of unsecured sealed first ends of greater than 70 membranes per square inch is achieved.

2. A method for sealing a free end of a hollow fiber membrane for use in a single-header filtration module, comprising:
    inserting an unsecured first end of said membrane in a low-viscosity light-curable adhesive having a viscosity less than 5000 cps,
    removing said unsecured first end from said adhesive whereby a coating of said adhesive is formed on an exterior of said unsecured first end,
    after removing said unsecured first end from said adhesive, exposing said unsecured first end to a light source to cure said adhesive,
    wherein said coating on the exterior of said unsecured first end after said exposing step has a thickness between 0.05 mm and 0.8 mm; and
    securing a plurality of second unsealed ends of membranes in a header such that a density of unsecured sealed first ends of greater than 70 membranes per square inch is achieved.

3. The method of claim 2, wherein said unsecured sealed first ends permit said hollow fiber membranes to move freely with respect to each other.

4. The method of claim 2, wherein said hollow fiber membranes have a diameter of approximately 2.4 mm to 2.6 mm.

5. A method for sealing a free end of a hollow fiber membrane for use in a single-header filtration module, comprising:
    inserting an unsecured first end of said membrane in a low-viscosity light-curable adhesive having a viscosity less than 5000 cps,
    removing said unsecured first end from said adhesive whereby a coating of said adhesive is formed on an exterior of said unsecured first end,
    after removing said unsecured first end from said adhesive, exposing said unsecured first end to a light source to cure said adhesive,
    wherein said coating on the exterior of said unsecured first end after said exposing step has a thickness between 0.05 mm and 0.8 mm; and
    securing a plurality of second unsealed ends of membranes in a header such that a density of unsecured sealed first ends of greater than 81 membranes per square inch is achieved.

6. A method for sealing a free end of a hollow fiber membrane for use in a single-header filtration module, comprising:
    inserting an unsecured first end of said membrane in a low-viscosity light-curable adhesive having a viscosity less than 5000 cps,
    removing said unsecured first end from said adhesive whereby a coating of said adhesive is formed on an exterior of said unsecured first end,
    after removing said unsecured first end from said adhesive, exposing said unsecured first end to a light source to cure said adhesive,
    wherein said coating on the exterior of said unsecured first end after said exposing step has a thickness between 0.05 mm and 0.8 mm; and
    securing a plurality of second unsealed ends of membranes in a header such that a ratio of the number of sealed first ends per square inch to the diameter of an individual membrane in inches is at least 714.

7. The method of claim 1, wherein said hollow fiber membranes have a diameter of approximately 2.4 mm to 2.6 mm.

8. A method for sealing a free end of a hollow fiber membrane for use in a single-header filtration module, comprising:
  inserting an unsecured first end of said membrane in a low-viscosity light-curable adhesive having a viscosity less than 5000 cps,
  removing said unsecured first end from said adhesive whereby a coating of said adhesive is formed on an exterior of said unsecured first end,
  after removing said unsecured first end from said adhesive, exposing said unsecured first end to a light source to cure said adhesive,
  wherein said coating on the exterior of said unsecured first end after said exposing step has a thickness between 0.05 mm and 0.8 mm and wherein said unsecured first end of said membrane remains unsecured after sealing.

9. The method of claim 8, wherein said adhesive has a viscosity less than 2000 cps.

10. The method of claim 9, wherein said adhesive has a viscosity between 100 and 1000 cps.

11. The method of claim 10, wherein said adhesive has a viscosity between 170 and 230 cps.

12. The method of claim 8, wherein said coating on the exterior of said first end after said exposing step has a diameter less than 4 mm.

13. The method of claim 8, wherein said inserting step comprises inserting said membrane into said adhesive to immerse a length of 2-10 mm of said membrane.

14. The method of claim 8, wherein said exposing step comprises exposing said first end to ultraviolet light.

15. The method of claim 8, wherein said light source has an intensity of at least 200 mW/cm$^2$.

16. The method of claim 8, wherein said inserting step comprises inserting between two and nine membranes into said adhesive at the same time and wherein said membranes are not potted in a header during said inserting step.

17. The method of claim 8, wherein said inserting step is automated.

18. The method of claim 8, wherein said hollow fiber membrane has not been secured in a header on either end.

19. The method of claim 8 further comprising a step of securing a second unsealed end of said membrane in a header and wherein said method does not comprise a step of inserting said sealed end of said membrane in a header.

20. The method of claim 19 wherein said securing step is performed after said removing step.

* * * * *